US010011670B2

(12) United States Patent
Nguyen et al.

(10) Patent No.: US 10,011,670 B2
(45) Date of Patent: *Jul. 3, 2018

(54) 2,3,3,3-TETRAFLUORO-1-PROPENE AS DILUENT FOR THE PREPARATION OF NOVEL BUTYL RUBBERS

(71) Applicant: ARLANXEO Singapore Pte. Ltd., Singapore (SG)

(72) Inventors: Paul Nguyen, London (CA); Steven John Teertstra, London (CA); Jessica Watson, London (CA)

(73) Assignee: ARLANXEO Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,125

(22) PCT Filed: Apr. 30, 2015

(86) PCT No.: PCT/CA2015/050363
§ 371 (c)(1),
(2) Date: Oct. 27, 2016

(87) PCT Pub. No.: WO2015/164971
PCT Pub. Date: Nov. 5, 2015

(65) Prior Publication Data
US 2017/0044286 A1    Feb. 16, 2017

(30) Foreign Application Priority Data

Apr. 30, 2014    (EP) .................................. 14166697

(51) Int. Cl.
| | | |
|---|---|---|
| C08F 14/18 | (2006.01) | |
| C08F 36/00 | (2006.01) | |
| C08F 10/00 | (2006.01) | |
| C08F 210/12 | (2006.01) | |
| C08F 8/20 | (2006.01) | |
| C08F 8/22 | (2006.01) | |
| C08F 6/00 | (2006.01) | |
| C08C 19/14 | (2006.01) | |

(52) U.S. Cl.
CPC ............ *C08F 210/12* (2013.01); *C08C 19/14* (2013.01); *C08F 6/003* (2013.01); *C08F 8/20* (2013.01); *C08F 8/22* (2013.01)

(58) Field of Classification Search
CPC .... C08F 8/22; C08F 8/20; C08F 6/003; C08F 210/12; C08F 4/005; C08F 236/08; C08C 19/14; C08L 23/22
USPC ...................................... 526/335, 348.7, 250
See application file for complete search history.

(56) References Cited

U.S. PATENT DOCUMENTS

| | | | |
|---|---|---|---|
| 7,723,447 | B2 | 5/2010 | Milner et al. |
| 8,747,756 | B2 | 6/2014 | Feller et al. |
| 8,846,792 | B2 | 9/2014 | Keung et al. |
| 9,068,031 | B2 | 6/2015 | Paul et al. |
| 9,512,240 | B2 | 12/2016 | Kirchhoff et al. |
| 9,834,618 | B2 | 12/2017 | Kirchhoff et al. |

FOREIGN PATENT DOCUMENTS

WO    WO2004058836 A1 *    7/2004

OTHER PUBLICATIONS

Puskas, J. E. , "Carbocationic Polymerizations", Encyclopedia of Polymer Science and Technology, John Wiley and Sons, New York, 2003, pp. 1-43.
Kirk-Othmer, Encyclopedia of Polymer Science and Engineering, Composites, Fabrication to Die Design, Compounding, vol. 4, 1986, John Wiley & Sons, Inc. pp. 66-79.
Kirk-Othmer, Encyclopedia of Chemical Technology, Bearing Materials to Carbon, 4th Edition, 1992, John Wiley & Sons, Abstract.
Morton, Maurice (editor), Rubber Technology, Third Edition, Chapter 10, Van Nostrand Reinhold Company, 1987 pp. 297-300.
Supplementary European Search Report from European Application No. 15786085, dated Oct. 19, 2017, three pages.
International Search Report from International Application No. PCT/CA2015/050363, dated Aug. 19, 2015, one page.

* cited by examiner

*Primary Examiner* — William Cheung

(57) ABSTRACT

The invention relates to an efficient polymerization process and its use to produce novel copolymers with a specific micro structure. In particular, the invention relates to butyl rubbers with novel micro structure, preferably those obtainable by copolymerization of monomer mixtures comprising isobutylene and isoprene in diluents comprising 2,3,3,3-tetrafluoro-1-propene. In a further aspect the invention relates to halogenated copolymers obtainable from such novel copolymers by halogenation.

20 Claims, No Drawings

2,3,3,3-TETRAFLUORO-1-PROPENE AS DILUENT FOR THE PREPARATION OF NOVEL BUTYL RUBBERS

This application is a national stage application filed under 35 USC § 371 of International Application No. PCT/CA2015/050363, filed Apr. 30, 2015, which claims the benefit of European Patent Application No. 14166697.4, filed Apr. 30, 2014, the entire contents of each of which are incorporated by reference herein as if set forth in their entireties.

FIELD OF THE INVENTION

The invention relates to an efficient polymerization process and its use to produce novel copolymers with a specific microstructure. In particular, the invention relates to butyl rubbers with novel microstructure, preferably those obtainable by copolymerization of monomer mixtures comprising isobutylene and isoprene in diluents comprising 2,3,3,3-tetrafluoro-1-propene. In a further aspect the invention relates to halogenated copolymers obtainable from such novel copolymers by halogenation.

BACKGROUND

Copolymers containing repeating units derived from isoolefins are industrially prepared by carbocationic polymerization processes. Of particular importance is butyl rubber which is a copolymer of isobutylene and a smaller amount of a multiolefin such as isoprene.

The carbocationic polymerization of isoolefins and its copolymerization with multiolefins is mechanistically complex. The catalyst system is typically composed of two components: an initiator and a Lewis acid such as aluminum trichloride which is frequently employed in large scale commercial processes.

Examples of initiators include proton sources such as hydrogen halides, carboxylic acids and water.

During the initiation step, the isoolefin reacts with the Lewis acid and the initiator to produce a carbenium ion which further reacts with a monomer forming a new carbenium ion in the so-called propagation step.

The type of monomers, the type of diluent or solvent and its polarity, the polymerization temperature as well as the specific combination of Lewis acid and initiator affects the chemistry of propagation and thus monomer incorporation into the growing polymer chain.

Industry has generally accepted widespread use of a slurry polymerization process to produce butyl rubber, polyisobutylene, etc. in methyl chloride as diluent. Typically, the polymerization process is carried out at low temperatures, generally lower than −90 degrees centigrade. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of up to 35 wt.-% in the reaction mixture can be achieved, as opposed to a polymer concentration of typically at maximum 20 wt.-% in solution polymerizations. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers.

The fact that the use of methyl chloride however restricts the range of catalysts that may be employed and further limits the temperature range for the polymerization to obtain the desired high molecular weights leads to products with low variability of the microstructure in particular the multiolefin distribution within the polymer chains. Further, slurry polymerizations in particular in methyl chloride suffer from particle agglogeration and fouling which leads to insufficient removal of the exothermic heat of polymerization and thus to inhomogeneous reaction conditions within the reactor.

Therefore, finding alternative polymerization conditions including specific combinations of initiators and diluents would not only reduce particle agglomeration and reactor fouling but also creation of novel polymers with specific sequence distributions which is highly desirable in industry due to the fact that such polymers would increase the options to influence curing behaviour by changing the distribution of crosslinking sites, in particular in applications where at least two types of rubber are cured simultaneously (co-curing). Moreover such polymers would open up a versatile platform to also produce novel polymers by postpolymerization modification.

As already mentioned above the sequence distribution of the final copolymer is influenced by the polymerization conditions which determine the relative reactivity of the comonomers employed. The sequence distribution of a copolymer may be expressed in terms of combinations of adjacent structural units. For example, characterizable sequences of two monomer units are called diads. Three monomer unit sequences are called triads. Four monomer unit sequences are called tetrads and so forth. Copolymers prepared under different conditions with the same comonomer incorporation may exhibit differences in their sequence distributions as expressed by the diad (or triad, etc.) fractions in the copolymer chain. Sequence distributions and comonomer incorporation are mathematically linked by probability statistics because of the competitive nature of the chemical events involved in copolymerization. A parameter that aids in the characterization of this relationship is the reactivity ratio, a ratio of the rate constants of homopropagation (adding a like monomer) to cross propagation (adding an unlike monomer). Copolymers with the same comonomer incorporation, but with different sequence distributions often exhibit different physical properties. See e.g. Chemical Microstructure of Polymer Chains, J. L. König, Wiley-Interscience, New York, 1980, and Polymer Sequence Determination: Carbon-13 NMR Method, J. C. Randall, Academic Press, 1977. An extreme, but well-known example is the comparison of the physical attributes of random and block copolymers.

It is generally known that conjugated dienes are less reactive than isobutylene in carbocationic copolymerization systems. Of the known linear conjugated dienes, isoprene is one of the more reactive dienes in copolymerization with isobutylene. This tendency towards lower reactivity of the conjugated diene is expressed in the sequence distribution of the prepared copolymers. At a given copolymer composition, isoprene units do not exhibit a tendency to follow other isoprene units in the copolymer chain. Consequently, BII (B=isobutylene, I=isoprene), IIB and III triad fractions are relatively low than compared to systems with more reactive comonomers.

Because isobutylene/isoprene copolymerations are often conducted in chlorinated hydrocarbons or mixtures of hydrocarbons and chlorinated hydrocarbons, the degree to which the sequence distribution can be varied is quite limited. Expression of this limitation is found by examination of the known reactivity ratios of isoprene for isobutylene/isoprene copolymerizations See e.g., J. E. Puskas, "Carbocationic Polymerizations" in Encyclopedia of Polymer Science and Technology, John Wiley and Sons, New York, 2003. Values for isoprene reactivity ratios under a variety of polymerization conditions fall below 1.4 indicating a narrow range of available isoprene centered triad fractions (BII, IIB and III) in the prepared copolymers.

EP 1572 766 A discloses a process to modify the sequence distribution of butyl rubbers by applying fluorinated hydrocarbons as diluent. In particular, EP 1572 766 A discloses copolymers wherein the sequence distribution parameter m, which can be calculated according to equation (I)

$$F=mA/(1+mA)^2 \qquad \text{(eq. I)}$$

wherein
- A is the molar ratio of multiolefin to isoolefin in the copolymer as determined by $^1$H NMR; and
- F is the isoolefin-multiolefin-multiolefin triad fraction in the copolymer as determined by $^{13}$C NMR; and is either from 1.10 to 1.25 or above 1.5. Specifically as can be seen in a written declaration of Dr. T. D. Shaffer submitted on Feb. 12, 2007 to the file of EP 1572 766 A, the parameter m also heavily depends on the isoprene content incorporated into the copolymer. For example an m-value of as low as 1.1 can only be obtained by incorporation of 15.5 mol.-% of isoprene using 1,1,1,2-tetrafluoroethane as a diluent, while polymers with lower contents of e.g. 3.32 mol.-% of isoprene obtained in the same diluent exhibit an m-value of 1.3.

The same document shows that the typical slurry polymerization process performed in methyl chloride leads to copolymers having an m-value of 1.3 (at an isoprene content of 12.7 mol.-%) to 2.1 (at an isoprene content of 2.55 mol.-%).

In view of that, and in order to broaden the variety of different butyl rubbers available for manufacturers of rubber products there is still a need to provide copolymers of isobutylene and multiolefins, in particular isoprene having more uniformly distributed crosslinking sites i.e. an even lower m-value than known from the state of the art.

SUMMARY OF THE INVENTION

In one aspect the invention provides copolymers of isobutylene and isoprene having a copolymer sequence distribution defined by equation (I)

$$F=mA/(1+mA)^2 \qquad \text{(eq. I)}$$

wherein
- A is the molar ratio of isoprene to isobutylene in the copolymer as determined by $^1$H NMR; and
- F is the isoolefin-isoprene-isoprene triad fraction in the copolymer as determined by $^{13}$C NMR; and and wherein m is in the range of $$[1.35-(0.03 \times MOC)] \geq m \geq [1.15-(0.03 \times MOC)]$$

whereby MOC is the content of isoprene in the copolymer in mol.-% as determined by $^1$H NMR.

The scope of the invention encompasses any possible combination of definitions, parameters and illustrations listed herein whether in general or within areas of preference.

Preferably, m is in the range of $$[1.35-(0.028 \times MOC)] \geq m \geq [1.16-(0.028 \times MOC)]$$

more preferably in the range of $$[1.32-(0.025 \times MOC)] \geq m \geq [1.17-(0.025 \times MOC)]$$

In one embodiment in the copolymers according to the invention the isobutylene content is from 85.0 to 99.5 mol.-% and the isoprene content is from 0.5 to 15.0 mol.-%. In a preferred embodiment the isobutylene content is from 88.0 to 99.0 mol.-% and the isoprene content is from 1.0 to 12.0 mol.-%.

In a specific embodiment the isobutylene content is from 86.2 to 99.5 mol.-% and the isoprene content is from 0.5 to 3.8 mol.-%, preferably the isobutylene content is from 86.3 to 99.0 mol.-% and the isoprene content is from 1.0 to 3.7 mol.-%, In another specific embodiment the isobutylene content is from 91.8 to less than 96.2 mol.-% and the isoprene content is from greater than 3.8 to 8.2 mol.-%, preferably the isobutylene content is from 92.0 to 96.0 mol.-% and the isoprene content is from 4.0 to 8.0 mol.-%.

In yet another specific embodiment the isobutylene content is from 88.0 to less than 91.8 mol.-% and the isoprene content is from greater than 8.2 to 12.0 mol.-%, preferably the isobutylene content is from 90.0 to 91.0 mol.-% and the isoprene content is from 9.0 to 10.0 mol.-%.

As used herein the term "content of isobutylene" or "content of isoprene" denotes the content of repeating units derived from isobutylene or isoprene within the copolymer.

The copolymers according to the invention may be halogenated by any known manner to obtain novel halogenated copolymers.

The scope of the invention therefore encompasses halogenated copolymers obtainable by halogenating the copolymers according to the invention. Preferably, halogenation means chlorination or bromination.

Preferably, the amount of halogen of such halogenated copolymers is in the range of from 0.1 to 8.0 wt.-%, preferably in the range of from 0.5 to 4 wt.-%, more preferably from 0.8 wt.-% to 3 wt.-%, even more preferably in the range of from 1.2 to 2.5 wt.-%, even still more preferably of from 1.5 wt.-% to 2.5% and most preferably of from 1.8 to 2.3 wt.-% by weight of the halogenated copolymer.

In one embodiment the weight average molecular weight of the halogenated copolymers according to the invention typically is in the range of 300 to 1000 kg/mol, preferably in the range of 300 to 700 kg/mol, more preferably in the range of 325 to 650 kg/mol, even more preferably in the range of 350 to 600 kg/mol, yet more preferably in the range of 375 to 550 kg/mol, and most preferably in the range of 400 to 500 kg/mol. As already mentioned above molecular weights are obtained using gel permeation chromatography in tetrahydrofuran (THF) solution using polystyrene molecular weight standards.

Different copolymers and halogenated copolymers according to the invention may be blended either with each other or with at least one secondary rubber, which is preferably selected from the group consisting of natural rubber (NR), epoxidized natural rubber (ENR), polyisoprene rubber, poly(styrene-co-butadiene) rubber (SBR), chloroprene rubber (CR), polybutadiene rubber (BR), perfluoroelastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, star-branched copolymer and halogenated star-branched copolymer, copolymers, brominated copolymer and chlorinated copolymer which are not subject of the present invention i.e. having a different sequence distribution, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-a-methylstyrene), halogenated poly(isobutylene-co-isoprene-co-a-methylstyrene) or with different copolymers and halogenated copolymers according to the invention and with at least one secondary rubber from the list set forth above.

Different copolymers and halogenated copolymers according to the invention may be further blended alternatively or additionally with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

The copolymers and halogenated copolymers according to the invention as well as the blends described above may further be compounded with one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 $m^2/g$. Some specific examples of carbon blacks are SAF, ISAF, HAF, FEF and GPF carbon blacks. Rubber gels are preferably those based on polybutadiene, butadiene/styrene copolymers, butadiene/acrylonitrile copolymers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 μm by volume. The particle size may be in a range of from 1 to 50 μm, or 1 to 30 μm, or 2 to 20 μm. In addition to silica, the nanoclays may also contain some fraction of alumina. For example, the nanoclays may contain from 0.1 to 10 wt % alumina, or 0.5 to 5 wt % alumina, or 1 to 3 wt % alumina. Examples of commercially available organically modified nanoclays as high aspect ratio mineral fillers include, for example, those sold under the trade name Cloisite® clays 10A, 20A, 6A, 15A, 30B, or 25A.

The copolymers and halogenated copolymers according to the invention as well as the blends and compounds described above are hereinafter collectively referred to as polymer products and may further contain other ingredients such as stabilizers, anti-oxidants, tackifiers, and/or other additives known to those of skill in the art.

Such ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

The polymer products may further contain a curing system which allows them to be cured.

The choice of curing system suitable for use is not particularly restricted and is within the purview of a person skilled in the art. In certain embodiments, the curing system may be sulphur-based, peroxide-based, resin-based or ultraviolet (UV) light-based.

A sulfur-based curing system may comprise: (i) a metal oxide, (ii) elemental sulfur and (iii) at least one sulfur-based accelerator. The use of metal oxides as a component in the sulphur curing system is well known in the art. A suitable metal oxide is zinc oxide, which may be used in the amount of from about 1 to about 10 phr. In another embodiment, the zinc oxide may be used in an amount of from about 2 to about 5 phr. Elemental sulfur, (component (ii)), is typically used in amounts of from about 0.2 to about 2 phr. Suitable sulfur-based accelerators (component (iii)) may be used in amounts of from about 0.5 to about 3 phr. Non-limiting examples of useful sulfur-based accelerators include thiuram sulfides (e.g. tetramethyl thiuram disulfide (TMTD)), thiocarbamates (e.g. zinc dimethyl dithiocarbamate (ZDC)) and thiazyl or benzothiazyl compounds (e.g. mercaptobenzothiazyl disulfide (MBTS)). A sulphur based accelerator of particular note is mercaptobenzothiazyl disulfide.

Peroxide based curing systems may also be suitable, especially for copolymer ionomers comprising residual multiolefin content in excess of about 0.2 mol %. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di (benzoylperoxy)hexane, (2,5-bis(tert-butylperoxy)-2,5-dimethyl hexane and the like. One such peroxide curing agent comprises dicumyl peroxide and is commercially available under the name DiCup 40 C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol %.

The polymer products may also be cured by resin cure system and, if required, an accelerator to activate the resin cure. Suitable resins include but are not limited to phenolic resins, alkylphenolic resins, alkylated phenols, halogenated alkyl phenolic resins and mixtures thereof.

The polymer products provide chemical and physical characteristics that make them highly useful in wide variety of applications. The low degree of permeability to gases as well as the evenly distributed unsaturation sites which may serve as crosslinking, curing or post polymerization modification site accounts for the largest uses of these rubbers, namely inner tubes and tire innerliners. These same properties are also of importance in air cushions, pneumatic springs, air bellows, accumulator bags, and pharmaceutical closures. The thermal stability of the polymers of the invention make them ideal for rubber tire-curing bladders, high temperature service hoses, and conveyor belts for hot material handling.

The polymer products further exhibit high damping and have uniquely broad damping and shock absorption ranges in both temperature and frequency which makes them useful e.g. in automobile suspension bumpers, auto exhaust hangers, body mounts and shoe soles.

The polymer products of the instant invention are also useful in tire sidewalls and tread compounds. In sidewalls, the polymer characteristics impart good ozone resistance, crack cut growth, and appearance.

The polymer products may be shaped into a desired article prior to curing. Articles comprising the cured polymer products include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing. Additional examples where the butyl ionomers may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

According to another aspect of the invention, there is provided a process for the preparation of the novel copolymers according to the invention, the process comprising at least, preferably exclusively the steps of:
  a) providing a diluent and a monomer mixture comprising at least isobutylene and isoprene in a mass ratio of monomer mixture to diluent of from 5:95 to 95:5, preferably from 40:60 to 95:5, more preferably from 45:55 to 85:15 and even more preferably from 61:39 to 80:20 to form a reaction medium;
  b) polymerizing the monomer mixture within the reaction medium in the presence of an initiator system to form a copolymer solution comprising the copolymer, the diluent and optionally but preferably residual monomers of the monomer mixture;
  c) separating residual monomers of the monomer mixture and preferably additionally the diluent from the reaction medium to obtain the copolymer
whereby step b) is carried out
  at a temperature in the range of −100° C. to 0° C., preferably in the range of −95° C. to −20° C. and even more preferably in the range of −95° C. to −60° C.
and whereby the diluent
  comprises at least 50.0 wt.-%, preferably at least 80.0 wt.-%, more preferably at least 90.0 wt.-% and even more preferably at least 95.0 wt.-%, yet even more preferably at least 98.0 wt.-% and yet even more preferably at least 99.0 wt.-% of 2,3,3,3-tetrafluoro-1-propene.

In one embodiment 2,3,3,3-tetrafluoro-1-propene is used as sole diluent, preferably in purities as commercially available.

The remainder to 100 wt.-% if existent may comprise diluents such as fluorinated or chlorinated or fluorinated and chlorinated hydrocarbons or aliphatic hydrocarbons.

Examples of chlorinated hydrocarbons include methyl chloride, methylene chloride or ethyl chloride.

Examples of fluorinated hydrocarbons include diluents represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

In one embodiment the fluorinated hydrocarbons is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1-,2-trifluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Further examples of fluorinated hydrocarbons include vinyl fluoride; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2- butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Examples of aliphatic hydrocarbons include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethyl-cyclopentane, ethylcyclopentane, cyclohexane, methylcyclohexane.

As used herein the term "at least substantially dissolved" means that at least 70 wt.-%, preferably at least 90 wt.-%, preferably at least 95 wt.-% the copolymer obtained according to step b) is dissolved in the diluent.

Step b) is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers.

Proton generating reactants include, for example water, alcohols such as methanol, ethanol, isopropanol, tert.-butanol and the like, phenols, thiols, carboxylic acids, hydrogen chloride or bromide and any mixture thereof. Water, alcohols, phenol or any mixture thereof is preferred. The most preferred proton source is water. A preferred ratio of Lewis acid to proton source is generally from 5:1 to 100:1 by weight, or from 5:1 to 50:1 by weight. The initiator system including the catalyst and proton source is preferably present in the reaction mixture in an amount of 0.02-0.1 wt.-%, based on total weight of the reaction mixture.

Alkyl aluminum halides are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

Where alkyl aluminum halides are employed water and/or alcohols, preferably water is used as proton source. In one embodiment the amount of water is in the range of 0.40 to 4.0 moles of water per mole of aluminum of the alkyl aluminum halides, preferably in the range of 0.5 to 2.5 moles of water per mole of aluminum of the alkyl aluminum halides, most preferably 1 to 2 moles of water per mole of the aluminum alkyl halide.

In an embodiment of the invention the polymerization according to step b) is effected using a polymerization reactor. Suitable reactors are those known to the skilled in the art and include flow-through polymerization reactors. Examples are disclosed in WO 2011/000922 A and WO 2012/089823 A.

The monomers employed are those disclosed above for the copolymers.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

The polymerization according to step b) is typically carried out in a manner that the solids content of the solution following polymerization is preferably in the range of from 3 to 20 wt.-%, more preferably 10 to 18 wt.-%, even more preferably from 12 to 18 wt.-%, yet more preferably from 14 to 18 wt.-%, even more preferably from 14.5 to 18 wt.-%, still more preferably 15 to 18 wt.-%, most preferably 16 to 18 wt.-%.

The conversion is typically stopped after a monomer consumption of from 5 wt.-% to 90 wt.-%, preferably of from 5 to 50 wt.-% and in another embodiment of from 5 to 25 wt.-%, preferably 10 wt.-% to 20 wt.-% of the initially employed monomers.

As used herein the terms "solids content" or "solids level" refer to weight percent of the polymer obtained according to step b) i.e. in polymerization and present in the final reaction mixture.

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

The reaction is typically stopped by quenching agents such as a 1 wt.-% sodium hydroxide solution in methanol or ethanol.

The conversion is typically stopped after a monomer consumption of from 5 wt.-% to 25 wt.-%, preferably 10 wt.-% to 20 wt.-% of the initially employed monomers.

Monomer conversion can be tracked by online viscometry or spectroscopic monitoring during the polymerizationAccording to step c) residual monomers of the monomer mixture and preferably additionally the diluent are separated from the reaction medium is to obtain the copolymer.

Such separation may employ distillation so subsequently or jointly remove the residual monomers and the diluent and to the extent desirable also extrusion as e.g. disclosed in WO2010/031823 A and WO2011/117280 A to lower the level of volatile components to a neclectable level. Distillation processes to separate liquids of different boiling points are well known in the art and are described in, for example, the *Encyclopedia of Chemical Technology*, Kirk Othmer, 4th Edition, pp. 8-311, which is incorporated herein by reference.

In an alternative embodiment the diluent employed comprises at least 95.0 wt.-%, preferably at least 98.0 wt.-%, more preferably at least 98.5 wt.-% and even more preferably at least 99.0 wt.-% of one or more aliphatic hydrocarbons having a boiling point in the range of 45° C. to 95° C., preferably 45° to 80° C. at a pressure of 1013 hPa and removal of unreacted residual monomers in step c) to obtain a solution of copolymer in the diluent to a level of less than 20 parts per million by weight.

Is distillation is employed about 40 trays have been found sufficient to achieve this degree of separation.

Generally, the unreacted monomers and the diluent may either be seperatly or jointly be recycled into step a) of the process according to the invention.

Following removal of the unreacted residual monomers, the copolymer is preferably halogenated in a step d).

The halogenated copolymer is produced using known solution phase techniques. The solution of the butyl is treated with a halogenation agent. Supplemental diluent may be added to the separated copolymer solution in order to form a so-called "cement" having the desired properties for halogenation. Preferably, the butyl polymer is brominated or chlorinated in the halogenation process. Preferably, the amount of halogen is in the range as disclosed above including its preferred embodiments.

The halogenation agent may comprise elemental chlorine ($Cl_2$) or bromine ($Br_2$) and/or organo-halide precursors thereto, for example dibromo-dimethyl hydantoin, tri-chloro isocyanuric acid (TCIA), n-bromosuccinimide, or the like. Preferably, the halogenation agent comprises or is bromine or chlorine. The amount of halogenation during this procedure may be controlled so that the final halogenated copolymer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase halogenation processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company©1987), particularly pp. 297-300, which are incorporated herein by reference.

The surprising advantage of the present invention is the fact that performing a polymerization under defined polymerization conditions such as monomer to diluent ratio, temperature and solvent composition and preferably also type and amount of initiator leads to new copolymer polymers having an unprecetended homogeneous multiolefin incorporation allowing to broaden the scope of applications for copolymers in particular for post polymerization modifications and curing.

EXAMPLES

Polymerization:

All polymerizations were done in a dried, inert atmosphere. The polymerizations were performed as batch reactions in 600 mL stainless steel reaction vessels, equipped with an overhead 4-blade stainless steel impeller driven by an external electrically driven stirrer. Reaction temperature was measured via a thermocouple. The reactor was cooled to the desired reaction temperature (−95° C.) by immersing the assembled reactor into a pentane cooling bath. The temperature of the stirred hydrocarbon bath was controlled to ±2° C. All apparatus in liquid contact with the reaction medium were dried at 150° C. for at least 6 hours and cooled in a vacuum-nitrogen atmosphere alternating chamber before use.

High purity isobutene and methyl chloride were received from a manufacturing facility and used as is.

The hydrofluorocarbon 1,1,1,2-tetrafluoroethane (>99.9% purity) (HFC-134a, Genetron@ 134a) and hydrofluoroolefin 2,3,3,3-tetrafluoro-1-propene (>99.99% purity) (HFO-1234yf, Solstice@ 1234yf Automotive Grade) were used as received. A II were condensed and collected as liquids in the dry box. Isoprene (Sigma-Aldrich, >99.5% purity) was dried over activated 3A molecular sieves for several days and distilled under nitrogen. A 1.0 M solution of ethylaluminum dichloride in hexanes (Sigma-Aldrich) was used as received. A solution of $HCl/CH_2Cl_2$ was prepared by bubbling anhydrous HCl gas (Sigma-Aldrich, 99% purity) through a pre-dried Sure/Seal™ bottle containing anhydrous $CH_2Cl_2$ (VWR). The $HCl/CH_2Cl_2$ solution was then titrated using 0.1 N NaOH (VWR) standard solution to determine its concentration.

The slurry polymerizations were performed by charging isobutene, isoprene, and liquefied diluent, (specified in each of the examples) into a chilled reaction vessel at polymerization temperature and stirred at a predetermined stirring speed between 500 to 900 rpm.

The initiator system solution were prepared in methyl chloride. The initiator system solution were prepared under the same temperature conditions as the reaction vessel by diluting the $HCl/CH_2Cl_2$ solution into an aliquot of methyl chloride and adding the 1.0 M solution of the ethylaluminum dichloride to a 1:4 molar ratio of HCl:EADC, followed by gentle swirling. The initiator system solution was used immediately. The initiator system solution was added to the polymerization using a chilled glass Pasteur pipette. The reaction was allowed to run for 5 minutes and stopped by the addition of 2 mL of a 1% sodium hydroxide in ethanol solution. Conversion is reported as weight percent of monomers converted to polymer during polymerization.

Examples 1 to 12

A series of polymerizations were performed in pure methylchloride, pure 1,1,1,2-tetrafluoroethane or pure pure 2,3,3,3-tetrafluoro1-propene at −95° C. All polymerizations were performed consistently as described above. Polymerizations were run with 180 mL diluent, 20 mL isobutene and various amounts of isoprene. The initiator system solution was prepared in 80 mL methylchloride by adding 11 mL of a 0.18 M $HCl/CH_2Cl_2$ solution and 8 mL of a 1.0 M hexane solution of ethylaluminum dichloride (EADC). 5 ml of said initiator system solution was used for all polymerizations according to examples 1 to 12.

Isoprene incorporation was determined by $^1$H-NMR spectrometry. NMR measurements were obtained using a Bruker DRX 500 MHz spectrometer (500.13 MHz) using CDCl$_3$ solutions of polymers with the residual CHCl$_3$ peak used as an internal reference.

Triad sequence distributions were obtained from $^{13}$C-NMR spectrometry using a Bruker DRX 500 MHz spectrometer (500.13 MHz) using CDCl$_3$ solutions of polymer (6-8 wt %) containing 1.5% wt/v chromium (III) acetylacetonate as a relaxation agent. Data acquisition and processing were performed as described in U.S. Pat. No. 7,332,554. [3]

The results are summarized in Table 1.

TABLE 1

| Ex. | Diluent | Conversion (Wt. %) | Total Unsats[1] (mol %) | BII[2] (%) | m | Ratio BII/Unsats | ε at −40° C. |
|---|---|---|---|---|---|---|---|
| 1 | MeCl | 58.9 | 2.55 | 4.99 | 2.12 | 1.96 | 13.86 |
| 2 | MeCl | 29.4 | 5.33 | 7.40 | 1.78 | 1.39 | |
| 3 | MeCl | 58.4 | 5.61 | 7.41 | 1.47 | 1.32 | |
| 4 | MeCl | 46.9 | 9.16 | 10.9 | 1.41 | 1.19 | |
| 5 | MeCl | 45.1 | 12.7 | 13.3 | 1.29 | 1.05 | |
| 6 | HFC-134a | 38.3 | 3.32 | 4.01 | 1.27 | 1.21 | 15.58 |
| 7 | HFC-134a | 34.1 | 6.98 | 7.88 | 1.26 | 1.13 | |
| 8 | HFC-134a | 37.8 | 10.8 | 11.3 | 1.23 | 1.04 | |
| 9 | HFC-134a | 13.1 | 15.5 | 14.0 | 1.10 | 0.90 | |
| 10 | HFO-1234yf | <10 | 3.95 | 4.52 | 1.21 | 1.14 | 12.29 |
| 11 | HFO-1234yf | <10 | 8.75 | 8.24 | 1.04 | 0.94 | |
| 12 | HFO-1234yf | <10 | 16.5 | 12.3 | 0.84 | 0.75 | |

[1]Total unsaturations = 1,4-isoprene (mol %) + isoprenoid (mol %)
[2]Calculated from the average BII fraction values determined for the quaternary and tertiary isoprene carbons

The invention claimed is:

1. Halogenated copolymers at isobutylene and isoprene having a copolymer sequence distribution defined by equation (I)

$$F = mA/(1-mA)^2 \quad \text{(eq. I)}$$

wherein
A is the molar ratio of isoprene to isobutylene in the halogenated copolymer as determined by $^1$H NMR;
F is the isobutylene-isoprene-isoprene triad traction in the copolymer as determined by $^{13}$C NMR; and
m is in the range of $$[1.35-(0.03 \times MOC)] \geq m \geq [1.15-(0.03 \times MOC)]$$

whereby MOC is the content of isoprene in the halogenated copolymer in mol-% as determined by $^1$H NMR.

2. The halogenated copolymers according to claim 1, wherein $$[1.35-(0.028 \times MOC)] \geq m \geq [1.16-(0.028 \times MOC)].$$

3. The halogenated copolymers according to claim 1, wherein $$[1.32-(0.025 \times MOC)] \geq m \geq [1.17-(0.025 \times MOC)].$$

4. The halogenated copolymers according to claim 1, wherein the isobutylene content is from 85.0 to 99.5 mol.-% and the isoprene content is from 0.5 to 15.0 mol.-%.

5. The halogenated copolymers according to claim 4, wherein the isobutylene content is 862 to 99.5 mol.-% and the isoprene content is 0.5 to 3.8 mol.-%.

6. The halogenated copolymers according to claim 1, wherein an amount of halogen of the halogenated copolymers is 0.1 to 8.0 wt.-%, by weight of the halogenated copolymer.

7. A process for the preparation of copolymers of isobutylene and isoprene having a copolymer sequence distribution defined by equation (I)

$$F = mA/(1-mA)^2 \quad \text{(eq. I)}$$

wherein
A is the molar ratio of isoprene to isobutylene in the copolymer as determined by $^1$H NMR; and
F is the isoolefin-isoprene-isoprene triad fraction in the copolymer as determined by $^{13}$C NMR; and
m is in the range of $$[1.35-(0.03 \times MOC)] \geq m \geq [1.15-(0.03 \times MOC)]$$

whereby MOC is the content of isoprene in the copolymer in mol-% as determined by $^1$H NMR,
the process comprising:
polymerizing monomers of a monomer mixture comprising isobutylene monomers and isoprene monomers, in a diluent at a mass ratio of monomer mixture to diluent of 5:96 to 95:5, and in the presence of an initiator system to form a copolymer solution comprising the copolymer, the diluent and residual monomers of the monomer mixture; and
separating the residual monomers of the monomer mixture and the diluent from the copolymer solution to obtain the copolymer,
whereby the polymerizing is carried out
at a temperature of −100 to 0° C., and
whereby the diluent
comprises at least 50.0 wt.-% of 2,3,3,3-tetrafluoro-1-propene.

8. The process according to claim 7, wherein for the diluent the content of aliphatic hydrocarbons having a boiling point of 5° C. to 95° C. at a pressure of 1013 hPa and being linear (n-alkenes) does not exceed 85 wt.-%.

9. The process according to claim 7, wherein for the diluent the content of cyclic hydrocarbons having a boiling point of 5° C. to 95° C. at a pressure of 1013 hPa does not exceed 25 wt.-%.

10. The process according to claim 7, wherein the initiator system comprises ethyl aluminum sesquichloride.

11. The process according to claim 7, wherein for the initiator system water and/or alcohols is used as proton source.

12. The process according to claim 7, wherein the copolymers are halogenated and after separating the residual monomers and the diluent from the copolymer solution to obtain the copolymers, the process further comprises halogenation of the copolymers.

13. The process according to claim 12, wherein the halogenation is carried out using elemental chlorine (Cl$_2$) or bromine (Br$_2$) as halogenation agent.

14. A polymer product comprising the halogenated copolymers according to claim 1, either cured or uncured.

15. The halogenated copolymers according to claim 1, wherein the isobutylene content is 36.3 to 99.0 mol.-% and the isoprene content is from 1.0 to 3.7 mol.-%.

16. The halogenated copolymers according to claim 1, wherein an amount of halogen of such halogenated copolymers is 1.8 to 2.3 wt.-% of the total weight of the halogenated copolymer.

17. The halogenated copolymers according to claim 1, wherein the isobutylene content is 88M to 99.0 mol.-% and the isoprene content is 1.0 to 12.0 mol.-%.

18. The halogenated copolymers according to claim 1, wherein an amount of halogen of the halogenated copolymers is 0.8 to 3 wt.-%, by weight of the halogenated copolymer.

19. The process according to claim 7, wherein the diluent comprises at least 90.0 wt.-% of 2,3,3,3-tetrafluoro-1-propene.

20. The process according to claim 7, wherein the diluent comprises at least 98.0 wt.-% of 2,3,3,3-tetrafluoro-1-propene.

* * * * *